Aug. 15, 1961     E. H. VOIGTMAN ET AL     2,996,424
METHOD OF CREPING TISSUE AND PRODUCT THEREOF
Original Filed Feb. 12, 1957                    2 Sheets-Sheet 1

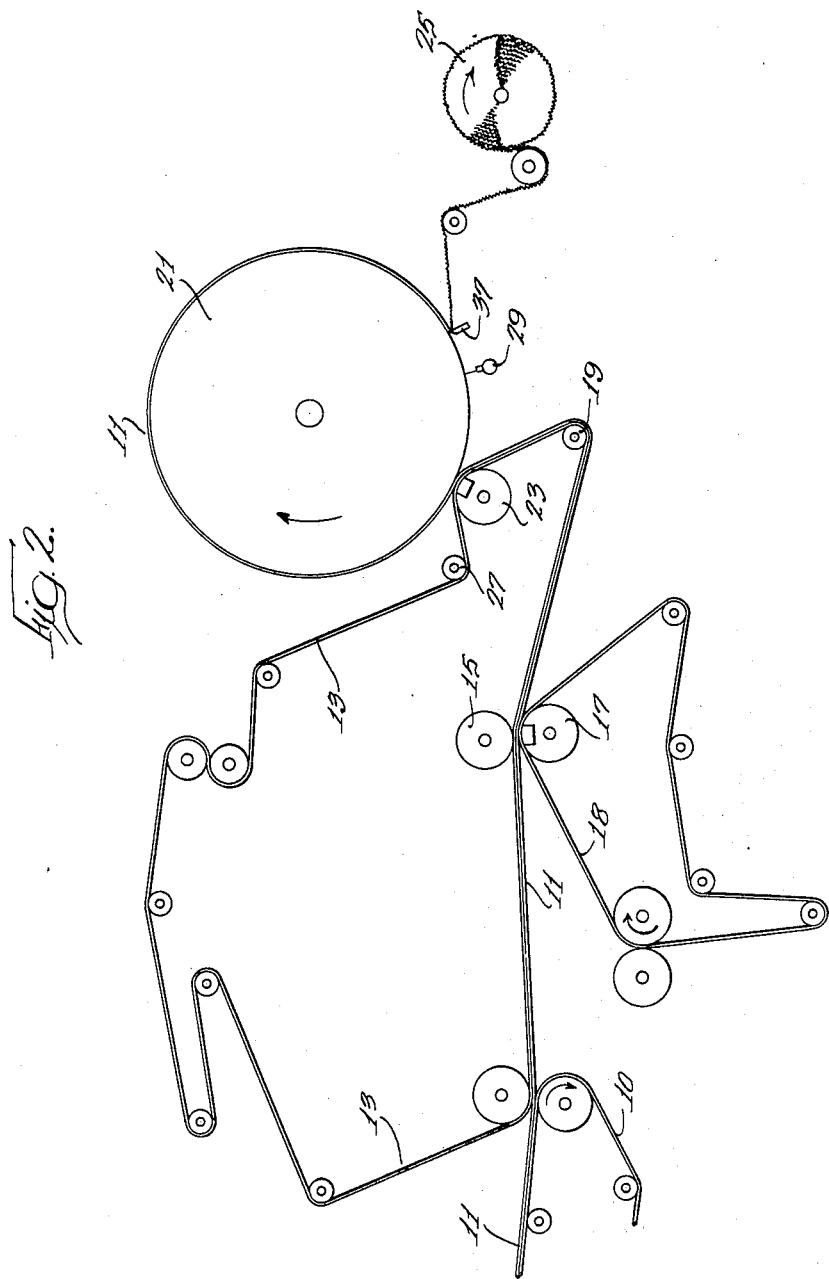

United States Patent Office 2,996,424
Patented Aug. 15, 1961

2,996,424
METHOD OF CREPING TISSUE AND PRODUCT THEREOF
Edward H. Voigtman, Neenah, Harold F. Donnelly, Appleton, and Charles A. Lamb, Neenah, Wis., assignors to Kimberly-Clark Corporation, Neenah, Wis., a corporation of Delaware
Original application Feb. 12, 1957, Ser. No. 639,792. Divided and this application Mar. 20, 1959, Ser. No. 800,821
4 Claims. (Cl. 162—112)

This invention in general relates to an improved tissue structure and a method of making the same. This invention more particularly relates to improved multi-ply creped cellulosic tissue products and the manufacture thereof.

This application is a division of application Serial No. 639,792, filed February 12, 1957.

Multi-ply creped tissue products utilized for certain applications such as for packaging, padding, cushioning, insulating, wiping, etc. require low density and high bulk. Where prior multi-ply creped tissue products, such as are used for insulating and cushioning, were manufactured so as to exhibit especially low density and high bulk, it was found they could be easily and permanently compressed or crushed to a condition of higher density and lower bulk. Accordingly, the originally high insulating and cushioning properties of these tissue products were materially reduced when subjected to stress.

Difficulties have also been encountered in providing multi-ply tissue products for wiping purposes which not only are of low density and high bulk and are relatively self-supporting and stable during use, but which also have a greatly decreased tendency to lint or cast off free fibers, and have a sufficiently coarse surface or bite to easily remove from the surface to be cleaned dirt, grime and other discrete substances.

It has now been found that improved multi-ply cellulosic tissue products can be fabricated by differentially creping cellulosic tissue sheets in a suitable manner and then combining them to provide in the products improved structural stability, together with high bulk and low density. These high bulk and low density characteristics are retained even when such products are subjected to considerable compressive force. Accordingly, the improved multi-ply products are highly satisfactory for use as packing and padding materials.

The multi-ply cellulosic tissue products of the present invention present relatively coarse, uneven surfaces, so that they are also adaptable as wiping agents. Furthermore, the fibers of these products are more strongly bonded to each other in selected areas and have less tendency to lint, which adds to their utility as wiping agents.

The improved cellulosic tissue products of the present invention which comprise a plurality of plies of differentially creped cellulosic tissue are fabricated in a wholly unique manner in accordance with the method of the present invention.

Accordingly, it is an object of this invention to provide improved, stable, creped, cellulosic tissue products and a method of making the same. More specifically, it is also an object of this invention to provide novel creped tissue products which, as a result of a differential creping process, are relatively lint free and have improved coarse surfaces with improved bite characteristics, and a method of making the same. It is a further object of this invention to provide means and procedures for obtaining stable, differentially creped, multi-ply, cellulosic tissue products having improved low density and high bulk characteristics.

Further objects of this invention will be apparent from the following detailed description and the accompanying drawings of which:

FIGURE 2 is a schematic representation of apparatus on which the differential creping of the present invention may be carried out.

Figure 1:
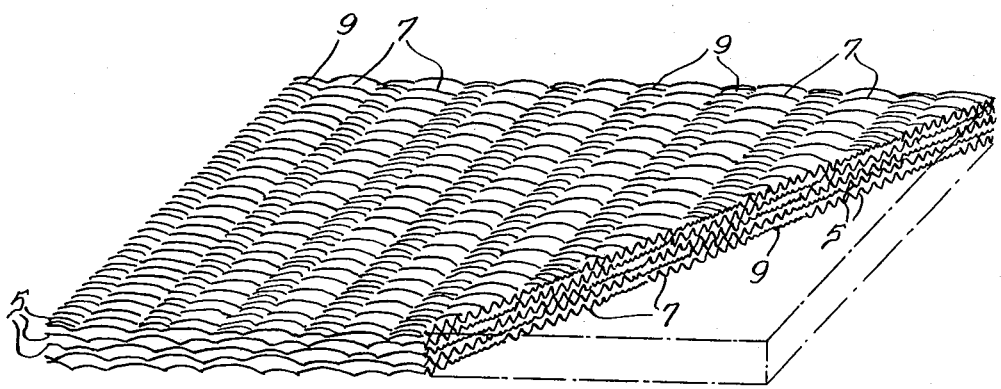
FIGURE 1 is an isometric view and partial cross section of a multi-ply tissue product of the present invention.

Referring now more particularly to the accompanying drawings, FIGURE 1 shows a multi-ply, differentially creped tissue product, produced in accordance with the present invention. The illustrated product comprises a plurality of superposed, cellulosic tissue webs or sheets 5. For the purposes of the present invention, the number of plies utilized in the product may be two or more, depending upon the particular application for which the product is to be used. The individual sheets in the product are formed tissue webs having a basis weight, on a bone dry basis, before differential creping of between about 3.5 pounds and about 15 pounds per ream of 3,000 square feet. The preferred basis weight range for these sheets depends upon the particular end use for which the products are intended. For example, if the sheets are to be utilized for cushioning or insulating purposes, the preferred basis weight range is between about 4.5 pounds and about 7.5 pounds per ream of 3,000 square feet, on a bone dry basis, before differential creping. For wiping purposes, this preferred range is 9 to 15 pounds per ream.

Each of the cellulosic tissue webs or sheets 5 has a series of alternating coarsely creped areas 7 and more finely creped areas 9. The alternating coarsely creped areas 7 and more finely creped areas 9 provide alternating puffed and flat areas which give the product its unique properties. The fine crepes in the flat areas function as stabilizers holding the arches of the coarse crepe in place and enabling the latter to act as structural members to provide the product with its stable bulk characteristics. Although in FIGURE 1 these areas are shown as being a series of rather broad parallel bands, they may be in any suitable pattern such as diagonals, concentric circles, dots, squares, discontinuous areas, cross-hatched areas and the like. It is important, however, that the coarsely creped and more finely creped areas alternate or are interspersed so as to provide structural stability to each of the coarsely creped areas of the web. When alternated properly the finely creped areas act in the manner of a structural truss to hold the coarsely creped areas in position.

It is well known in the art that up to a certain degree, coarser creping can be achieved by using thicker creping blades. However, this does not provide a product having the stabilized increased bulk of the present invention since the coarser crepe so produced has an incipient tendency to collapse or flatten out, and therefore has very little ability to support loads under stress. In the present invention, the coarsely creped areas provide vertical components of large comparative magnitude, while the finer creping imparts a structural rigidity to the coarse crepe to provide a relatively stable product of increased bulk and low density.

The coarsely creped areas 7 of the plies of the tissue product should have been about 5 and about 30 crepes per inch as the product is wound onto the reel at the end of the paper machine, and preferably between about 10 and 20 crepes per inch. The more finely creped areas 9 of the respective plies should have between about 20 and about 200 crepes per inch, and preferably between about 30 and about 50 crepes per inch. Some stretching usually takes place as the sheets are plied up into the product of this invention, to the extent of about 10 percent of their length.

The webs or sheets comprising the plies of the product have a crepe ratio between about 1.25 and 2.5. A crepe ratio of about 2.0 is preferred. By crepe ratio is meant the ratio of the length of the flat sheet before creping to the length of the sheet after creping.

The coarsely creped areas 7 of the plies of the product should comprise between about 15 percent and about 85 percent of the total area of each of the plies, preferably between about 40 percent and about 60 percent. The finely creped areas 9 of the plies comprise the remainder of the creped area of the plies. The respective plies of the product may be assembled in uniform or in random distribution with respect to the alignment or coarsely creped and finely creped areas of the plies. After the tissue sheets are assembled the multi-ply product of the present invention has a density between about 1.3 pounds and about 2.0 pounds per cubic foot. The product has a bulk up to about 100 percent greater than comparable conventionally creped tissue products.

The manufacture of improved multi-ply creped cellulosic tissue products in accordance with the present invention involves the steps of forming sheets or webs of tissue in a conventional manner and then differentially creping each of the tissue webs or sheets so as to provide alternating or discontinuous desired areas of coarse crepe and of more fine crepe. A plurality of the individual sheets or webs of the differentially creped tissue are then assembled into a unitary structure which is the improved multi-ply tissue product of the present invention, as illustrated in FIGURE 1.

In accordance with the method of the present invention, a sheet or web of fibrous tissue is formed by a water-laying technique on the usual Fourdrinier-type web-forming equipment. The mat of fibers of which the web is composed is formed by applying to the upper surface of the Fourdrinier wire, as by flowing thereon, a layer of stock containing the required amount of fibers in an amount of water which is sufficient to produce the proper distribution of the fibers in the web, and subsequently eliminating sufficient of the water to produce a coherent web or sheet capable of being couched off the end of the wire.

For the purposes of the present invention, the sheet may be made of various cellulosic and other fibers which are normally used in the fabrication of tissue webs or sheets. The proportions and types of such fibers may be adjusted in accordance with the uses to which the tissue product is to be applied. The useful cellulosic fibers include chemical wood pulp fibers, mechanically produced wood pulp fibers, cotton fibers, etc. Suitable chemical wood pulp fibers include those produced by the sulfite, sulfate and semi-chemical pulping processes. The fibers may be bleached, but this is purely a matter of choice, depending upon the type of end product desired. Various synthetic fibers such as rayon, nylon, glass, polyvinyl chloride and cellulose acetate fibers may be added in varying amounts to the furnish to provide webs having certain specific properties. The furnish is mixed with a suitable amount of water to make up a stock or suspension.

The tissue web may be formed on a Fourdrinier web-forming machine having an open or spout type head box or on a cylinder vat machine. The drier section of a Fourdrinier machine is illustrated generally in the schematic view, FIGURE 2.

As produced on such a machine the formed cellulosic tissue web normally has a moisture content of approximately 85 percent by weight as it leaves the wire before drying. Moisture content of the web is further reduced to between 70 and 80 percent by the main press and to about 65 percent as the web is applied to the drier by the press roll. The drying of the tissue web comprises reducing the moisture content thereof by heat to between about 3 percent and about 14 percent by weight of the tissue, on a bone dry basis. The drying operation is carried out in the conventional manner on a single, large diameter, heated drier roll of the Yankee type. The Yankee drier comprises a heated cylinder which may be as large as 15 feet or more in diameter and of equal or greater length. It may be fabricated from a single casting of cast iron which is ground to a smooth surface. Alternatively, the Yankee drier may be constructed as set forth in U.S. Patent No. 2,725,640 of December 6, 1955, to Voigtman, or may be of any other suitable design or material.

Referring now more particularly to FIGURE 2 of the accompanying drawings, the wet tissue web 11 after being couched in the usual manner from the forming wire 10 at a moisture content of about 85 percent, is carried by a top felt 13 through the main press which includes a top press roll 15, a bottom suction press roll 17 and a bottom felt 18. The press rolls partially dewater the wet web to a moisture content of about 70 percent to about 75 percent by weight, on a bone dry basis. The web 11 is then carried by the top felt 13 around the usual tail roll 19, and into the pressure nip between the Yankee drier cylinder 21 and a rubber covered suction press roll 23. Press roll 23 acts to press web 11 firmly onto the surface of cylinder 21. At this point the moisture content of the web is about 65 percent by weight.

As indicated in FIGURE 2, cylinder 21 rotates in a clockwise direction, carrying web 11 with it during rotation. The creped web is wound up into a soft roll or reel 25 which rotates at a controlled peripheral speed. The drier operates at an even surface temperature between about 190° F. and about 212° F. and normally rotates at surface speeds in excess of 1,000 feet per minute. At this temperature and speed of rotation the web is reduced to a moisture content of between about 3 and 14 percent by weight before it is creped. Beyond the pressure nip, top felt 13 leaves web 11, and passes around roll 27 and associated rolls to return for reuse in the processing of the tissue web.

Referring again to FIGURE 2, as cylinder 21 rotates, means 29 continuously applies a release agent in a predetermined pattern to the adjacent surface of cylinder 21.

The release agent for the purposes of the present invention may be one or more compounds which are miscible with water or another volatile carrier. By miscible is meant dispersible in or soluble in the volatile carrier. Air also can be used as the carrier, applying the release agent in the form of a mist. The release agent must impart a degree of oiliness to steel of less than 0.3 at 20° C., expressed as the coefficient of friction, determined as described later in this specification.

Figure 3:
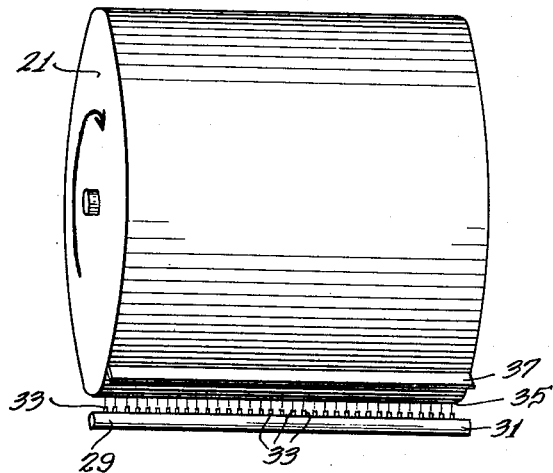
FIGURE 3 is a somewhat schematic representation of a micro-jet spray boom in relation to the drier surface.

In FIGURE 3, means 29 is shown as a boom 31 having spaced micro-jets 33 directed at the adjacent drier surface 35 and extending substantially over the entire width of the drier 21. The release agent is applied to the drier surface in a predetermined pattern for differential creping, as hereinafter more specifically set forth. Generally, enough release agent must be applied to form a film on predetermined areas only of the drier surface. This film should be substantially completely absorbed by the web on the drier, so that there is substantially no residual release agent left on the drier surface beyond the creping doctor blade. The optimum amount of release agent suitable for the purposes of the present invention is just short of that which would leave a residual amount on the drier. However, a small residual is not detrimental to the process provided it does not cause excessive build up on the surface of the drier. These release agents have been used with varying degrees of effectiveness in amounts ranging from 0.5 pound to 50 pounds per ton of product. (The preferred operating range is from 1 to 10 pounds per ton.)

Any other apparatus which applies the release agent to the drier surface in a controlled pattern may be utilized in this invention. In this connection, a patterned rubber printing roll may be used. If such a printing roll is keyed to the drier so that it prints the pattern in exact register at each revolution, the exact control of the amount of release agent used is not as critical because a residual carryover does not alter the pattern. In addition, an arrangement of wicks or other equipment to wipe the release agent on certain areas of the drier surface may be used.

The release agent should be applied in a pattern to the exposed Yankee drier surface between the conventional creping doctor blade 37, attached to the drier, and the nip between drier cylinder 21 and press roll 23, as shown in FIGURE 2. Moreover, the point of application of the release agent should be so chosen as to allow a sufficient period of time to elapse before the release agent on the drier surface enters the previously-mentioned nip. This is to allow the volatile components of the release agent on the drier surface to evaporate and leave behind the greasy or oily residue in a non-migrating pattern on the drier surface, which pattern will not substantially spread in the nip between the press roll and drier. Accordingly, it is preferred to apply the release agent relatively near the creping doctor blade. The optimal point of application of the release agent necessarily depends on the amount and concentration of release agent applied to the drier surface, the surface temperature of the drier and the nature of the volatile constituents of the release agent.

In the event a series of heated drier rolls are utilized in place of the Yankee drier, the release agent is applied in the previously described manner to the exposed surface of the drier roll on which the creping is performed and prior to the pressure nip between the drier roll and associated press roll.

It is also within the scope of the present invention to apply the release agent in a pattern to the exposed surface of the web, as by a patterned rubber printing roll, while the web is on the Yankee or other drier roll, so as to allow the pattern of release agent to penetrate the web to the drier surface and thereby effect the desired differential release of the web. In this connection, the point of application of the pattern of release agent to the web on the drier should be chosen so as to allow sufficient penetration of the release agent and evaporation of its volatile constituents, thereby assuring substantial differential release of the web.

As web 11 is carried on cylinder 21, as shown in FIGURE 2, it is dried to a moisture content of between about 3 and about 14 percent by weight by the time it reaches the creping doctor blade 37. This blade dry crepes the web from the drier.

It should be noted that the web is dry creped, as distinguished from wet creped or semi-creped, that is, the web is dried shortly after forming, and is creped directly off the drier at a moisture content usually less than 14 percent. In wet creping, the sheet is dried, then rewetted and reapplied to a drier and creped therefrom. In semi-creping, the doctor blade is used on a drier usually located about half way along in the drier section and produces only a limited amount of crepe (in the vicinity of 5 to 15 percent). The natural adherence of the tissue web to the surface of the drying cylinder is reduced in those places where the release agent is present. Consequently, as the web is creped from the drier surface by the scraping action of the creping doctor blade, it assumes a differential crepe pattern caused by this differential degree of adherence to the drier surface.

It is important to recognize that the present invention is directed primarily to the dry creping process. The products produced by dry creping differ materially from those produced by wet creping and semi-creping, both in their appearance and in their functional characteristics.

The release agent is applied to the drier surface to control the physical characteristics of the creping. The more easily the dried web is released from the drier surface, the coarser the type of creping effected by the creping doctor blade. Accordingly, when the release agent is applied to the surface of the drier in a pattern, there will be a corresponding pattern of coarse crepe in the creped web. In the surface areas of the drier left untreated with release agent the corresponding areas of the web will be released in the normal manner. Consequently, these areas will be more finely creped.

The differentially dry creped tissue product will show, as previously described, a pattern of coarsely and more finely creped areas, which differentially creped areas have been found to be responsible for the unique combination of improved structural stability, with low density and high bulk characteristics of the product.

As previously described, at least about 15 percent and not more than about 85 percent of the total area of the finished web should be coarsely creped, with the remainder of the area more finely creped. If more than about 85 percent of the total area of the web is coarsely creped, the structural stability of the web is impaired. In addition, the web will flatten out under compressive force and the initially increased bulk will be lost. If less than about 15 percent of the total surface of the web is coarsely creped, the tissue product does not have the low density and high bulk to the degree desired by the present invention. As previously indicated, the preferred range for the coarsely creped areas is between about 40 percent and about 60 percent.

As previously described, the release agent of the present invention may be one or more compatible compounds miscible with water or other volatile solvents and having an oiliness value or coefficient of friction of less than 0.3 at 20° C.

As used in this specification, the degree of oiliness expressed as the coefficient of friction is based on data obtained with the modified Deeley machine as used for static friction measurements in the commercial testing of lubricants. This machine consists of two opposing hard steel surfaces, one, a disc about 4 inches in diameter, and the other, three ½ inch diameter balls equally spaced around a circle 3 inches in diameter on the underside of a circular carriage. The carriage engages with a torque measuring device consisting of a coiled spring with an indicating mechanism. The pressure between the surfaces can be varied by loading the carriage with weights. The disc or lower friction surface is carried in a bath which contains the lubricant under test, and a gas ring is provided under the bath for heating the lubricant, the temperature being measured by a thermocouple in the bath.

The machine is operated by slowly rotating the disc by means of an electric motor and gearing. The frictional resistance between the surfaces causes rotation of the carriage against the action of the spring, and the disc is rotated until slipping of the surfaces occurs, when a pawl-and-ratchet mechanism prevents the spring from unwinding. The torque produced by the spring on the carriage at slip is thus equal to the friction torque and, as the total load is known, the coefficient of friction is easily obtained. This value is a measure of the boundary lubrication afforded by the substance tested.

The Deeley machine, the scale of oiliness values and the associated test are described in detail in the Journal of the Institute of Petroleum, vol. 26, No. 195, January 1940, pages 1 to 18, A. Fogg and S. A. Hunwicks, "The Static Friction of Lubricated Surfaces." Wherever reference is made to "degree of oiliness" or coefficient of friction in the specification and claims, it falls under the above description.

It has been found that at 20° C. the oiliness value or coefficient of friction for steel on steel is 0.6. With benzene present, the value is 0.5, with alcohol 0.42, with trichlorethylene 0.33, and with glycerol 0.2. Mineral oils and fatty oils have values in the range from about 0.12 to 0.15, while oleic acid has an exceptionally low value of about 0.06.

Examples of release agents which are suitable for the purposes of the present invention are the following:

Soaps comprising the sodium salts of oleic, stearic, and other fatty acids; emulsified mineral oil; wax emulsions; silicone emulsions; diglycol laurate; polyethylene glycol di-laurate; emulsified fatty acids of 6 to 18 carbon atom chain length, such as oleic, ricinoleic, palmitic, stearic and lauric acids; triethylene glycol; sulfonated castor oil; rewetting agents of the fatty ester type, and alkyl aryl polyether alcohols; alkyl ketene dimers, such as the ketene dimer of a fatty acid of 12 to 18 carbon atom chain length; softening agents of the sulfonated long chain hydrocarbon type; and, quaternary ammonium chlorides, such as dihydrogenated tallow di-methyl ammonium chloride.

The amount of release agent necessary to effect the differential releasing will depend on the oiliness of the release agent, the type of tissue web being released, the temperature of the drier cylinder surface and other factors. As previously indicated, the release agent should be utilized in a sufficient amount to effect the desired differential creping but preferably should not be more than that which can be absorbed by the web on the drier. That is, retention of excess release agent on the drier after differentially creping off the web is undesirable. The amount of an agent may vary as much as 0.5 to 50 pounds per ton of tissue web, depending on the type of furnish and basis weight of the web utilized, the type and amount of differential creping desired, and the type of release agent used.

The selection of the particular release agent may depend not only on its oiliness value but also on other characteristics of or imparted by particular release agents: water repellency, absorbency, softness, color, toxicity, odor, bactericidal and antimycotic properties, and the like.

Since only a relatively minute amount of the release agent need be utilized in practicing the present invention, the cost of achieving the differential creping effect is generally slight. Moreover, the great increase in bulk (up to 100 percent) over webs creped in the conventional manner results in a considerable lowering of the total cost of products assembled from differentially creped webs over comparable products made from conventionally creped webs.

In accordance with the method of the present invention, a plurality of the differentially dry creped expanded cellulosic tissue webs or sheets, fabricated as previously described, are then assembled in superposed relation to provide the desired multi-ply, cellulosic tissue product. For many purposes, the individual plies of the product adhere sufficiently together so that no other uniting means are required. However, when the product is to be subjected to considerable handling, it may be desirable to unite the plies to a greater extent by embossing or other suitable means.

The following examples set forth certain features of the present invention:

*Example I*

An unbleached cellulosic furnish, comprising primarily reclaimed fibers obtained from kraft cuttings and corrugates, was processed in a conventional manner on a commercial tissue making machine to produce a cellulosic tissue web having a basis weight of 5.34 pounds per ream of 3,000 square feet, on a bone dry basis, before creping. While the web was being dried to about 5 percent by weight moisture content in less than one second on a 12-foot diameter Yankee drier operating at about 190° F. surface temperature and a surface speed of approximately 1,600 feet per minute, a 0.167 percent, by weight, oil-in-water emulsion of a release agent, in this case, the ketene dimer of a fatty acid of 18 carbon atom chain length, was jetted onto the surface of the Yankee drier cylinder at 40 pounds per square inch pressure through a microjet spray boom. The microjet spray boom had nozzles of 0.008 inch diameter spaced at ¾ inch intervals across the entire width of the 12 feet diameter cylinder. The ketene dimer was utilized in an amount of about 1.23 pounds per ton of tissue product. The boom was located about .5 inch from the exposed surface of the drying cylinder, between the creping doctor blade and the associated press roll, about 24 inches from the pressure roll nip. The boom was so positioned as to allow time for the water to evaporate from the release agent before the sprayed-on material reached the press roll, thereby preventing the release agent from spreading in the pressure nip between the press roll and drier surface. The web was creped off the drier with a standard creping doctor blade at a crepe ratio of 2.00. The differentially creped web had roughly parallel lines of coarse crepe and fine crepe, each line of creping being about ⅜ inch wide. The coarsely creped areas and the finely creped areas each accounted for about 50 percent of the total area of the web. The finely creped areas had about 32 crepes per inch. The coarsely creped areas had about 15 crepes per inch.

A plurality of plies of the differentially dry creped web were assembled in random superposed relation into a finished tissue product. This product and a control product, dry creped to the same crepe ratio without the use of a pattern of release agent on the drier, were measured for height after 10 days' aging. It was found that the differentially creped product had an average of 43.5 percent greater bulk than the conventionally creped control product. The density of the product of the present invention was 1.95 pounds per cubic foot as compared with 2.9 pounds per cubic foot for the control. The product was suitable for a variety of uses, including a packing material, padding and wiping cloth.

It is normal practice in the industry to permit creped wadding products to age before taking bulk and density measurements, in order to allow it to establish a moisture equilibrium with its environment and avoid unnecessary variability caused by shrinkage.

Bulk measurements were made using the conditions set forth in paragraph 4.5 of Federal Specification PPP-C-843 "Cushioning Material, Cellulosic." Density was computed as outlined in paragraph 4.8 of the same Federal Specification.

*Example II*

A furnish comprised essentially of bleached sulfate fiber was processed in the manner described in Example I to obtain a tissue web. The formed cellulosic tissue web had a drier basis weight before creping of 4.60 pounds per ream of 3,000 square feet. A 0.167 percent, by weight, oil-in-water emulsion of the ketene dimer of a fatty acid of 18 carbon atom chain length was microjetted at 60 pounds' pressure, onto the surface of the Yankee drier of Example I operating at approximately 1,600 feet per minute surface speed, and, utilizing the same equipment and the same point of application as set forth in Example I. The ketene dimer was utilized in an amount of about 1.37 pounds per ton of tissue product. The web was dry creped off the drier with a standard creping doctor blade at a crepe ratio of 1.94. The differentially creped web had roughly parallel, ⅜ inch wide strips of coarse creping and fine creping, each type of creping covering about 50 percent of the total area of the web. The finely creped strips had an average of 40 crepes per inch, and the coarsely creped strips 15 crepes per inch.

A control sample was fabricated without the use of a pattern of release agent on the drier. A plurality of plies of the differentially dry creped web were assembled in random superposed relation into a finished tissue product, as were the same number of plies of the conventionally dry creped control tissue web. After 10 days' aging of each of the products, it was found that the differentially creped product had an average of 73.2 percent greater bulk than the conventionally creped control product. The density of the product of the present invention was 2.0 pounds per cubic foot while that of the conventional product was 3.3 pounds per cubic foot. The product of the present invention was suitable for use as a wiping agent, padding means and packing material, among other uses.

*Example III*

A furnish comprised essentially of bleached sulfate fiber was processed into a cellulosic tissue web in the same manner as set forth in Example I. The web had a drier basis weight before creping of 4.80 pounds per ream of 3,000 square feet. A water solution containing 0.33 percent by weight of diglycol laurate was then microjetted at 120 pounds pressure onto the surface of the Yankee drier of Example I operating at a surface speed of approximately 1,600 feet per minute. The microjetting equipment was the same as was utilized in Example I, as was the point of application of the release agent. The diglycol laurate was utilized in an amount of about 6.3 pounds per ton of tissue product. The web was differentially dry creped off the drier at a crepe ratio of 1.94. The resulting differentially dry creped web had an appearance comparable to the webs of Examples I and II, that is, approximately 50 percent of the web was coarsely creped and approximately 50 percent was finely creped.

The finely creped areas had about 37 crepes per inch and the coarsely creped areas about 14 crepes per inch.

A control dry creped tissue web was fabricated without using a pattern of diglycol laurate or other release agent on the drier. The webs were plied-up to form the differentially dry creped tissue product of the present invention and the conventionally dry creped control tissue product. After 10 days of aging, the two products were compared and it was found that the tissue product of the present invention had an average of 48.6 percent greater bulk than the control tissue product. The density of the product of the present invention was 2.0 pounds per cubic foot, while that of the conventional product was 3.3 pounds per cubic foot. The product of the present invention was particularly suitable for use as a packing material, as well as a wiping agent and padding means.

*Example IV*

An unbleached cellulosic furnish comprising primarily reclaimed fibers obtained from kraft cuttings and corrugates was processed in the manner described in Example I to obtain a tissue web. The formed cellulosic tissue web had a drier basis weight before creping of 5.34 pounds per ream of 3,000 square feet. A .167 percent by weight oil-in-water emulsion of fatty acid of 18 carbon atom chain length was microjetted at 20 pounds pressure onto the surface of the Yankee drier of Example I operating at approximately 1,800 feet per minute surface speed, and utilizing the same equipment and the same point of application as set forth in Example I. The fatty acid was used in the amount of about 1 pound per ton of product. The web was dry creped off the drier with a standard creping doctor blade at a crepe ratio of 2.00. The differentially creped web had roughly parallel, ⅜ inch wide strips of coarse creping and fine creping, each type of creping covering about 50 percent of the total area of the web. The finely creped strips had an average of 40 crepes per inch and the coarsely creped strips about 15 crepes per inch.

A dry creped control sample was made without using a pattern of fatty acid or other release agent on the drier. The webs were plied up to form the differentially dry creped tissue product of the present invention and the control conventionally dry creped tissue product. After 10 days of aging, the two products were compared and it was found that the tissue product of the present invention had an average of 95 percent greater bulk than the control tissue product. The density of the product was 1.58 pounds per cubic foot while that of the conventional product was 2.9 pounds per cubic foot. The product of the present invention was particularly suitable for use as a packing material as well as a wiping agent and padding means.

Examples I, II, III, and IV clearly demonstrate the improved results obtained by differentially dry creping cellulosic tissue webs through the application of a release agent in a pattern to the drier surface, rather than conventionally dry creping the tissue web to the same crepe ratio without the use of a pattern of release agent applied to the drier surface. In this connection, the differentially dry creped tissue products of the present invention exhibited had 43.5 percent, 73.2 percent, 48.6 percent, and 95 percent greater bulk than the respective conventionally creped controls. The densities of the multiply tissue products made by assembling sheets of the differentially dry creped webs made in accordance with the present invention were correspondingly lower than those of the respective conventional control products. The commercial importance in reducing the weight and hence the cost of tissue required for a given use or end result will be apparent.

Energy absorption tests were also run on the differentially dry creped tissue products of the present invention and it was found that these products had up to 50 percent more energy absorption per pound of product under low stress conditions than conventionally creped controls and up to 40 percent more energy absorption under high stress conditions. Moreover, the tissue products of the present invention were found to be stable under stress, that is, they did not lose any more of their greater bulk after repeated impacts than did an equivalent thickness of conventional lower bulk material. Accordingly, the greater bulk of these products represents a substantial and permanent improvement in their cushioning properties.

The differentially dry creped tissue products of the present invention can be provided with certain other valuable properties by combining the plies thereof with various other materials which do not substantially impair the improved characteristics of the products. For example, bonding materials may be added during the assembling of the plies of the product of the present invention into a finished unitary construction.

The number of plies of the tissue products of the present invention are varied so as to provide the bulk and cushioning properties required for any given use.

As is seen from the above, the differentially creped tissue products of the present invention constitute an important novel product having certain highly advantageous characteristics not present in the dry creped tissue products previously known in the art. Moreover, the products of the invention can be manufactured at high speed and in an economical manner on existing papermaking equipment. These products have the necessary low density, high bulk and surface characteristics for use as packing materials, wiping cloths, padding agents and the like and, as above noted, when used for these purposes, have important advantages over the prior art products.

Other suitable modifications of the differentially dry creped cellulosic tissue products of the present invention and the method of making the same, as are within the skill of those versed in the art, are contemplated as being within the scope of the present invention.

What we claim is the following:

1. A method of fabricating an improved dry creped cellulosic tissue product, said method including the steps of water-laying a web of cellulosic tissue, drying the formed tissue web on a heated rotating member to a moisture content of between about 3 and about 14 percent by weight, applying to the surface of said rotating member before said surface contacts said web a non-migrating pattern of fluid release agent having an oiliness value of less than 0.3 at 20° C. as measured on the modified Deeley machine, said pattern of release agent being applied to said rotating member in an amount sufficient to decrease to a predetermined extent the tendency of between about 15 percent and about 85 percent of said web to adhere to said rotating member and not more than an amount completely absorbable by said web on said member, differentially creping the dried web from said member to a crepe ratio for said web of between about 1.25 and about 2.5, and assembling plies of said differentially creped web in superposed relation to form a finished cellulosic tissue product.

2. A method of fabricating an improved dry creped cellulosic tissue product, said method including the steps of water-laying a web of cellulosic tissue, said web having a basis weight between about 3.5 and about 15 pounds per ream of 3,000 square feet, on a bone dry basis, drying the formed tissue web on a rotating drying member to a moisture content of between about 3 and about 14 percent by weight, applying to the surface of said rotating member before said surface contacts said web a non-migrating pattern of a release agent having an oiliness value of less than 0.3 at 20° C. as measured on the modified Deeley machine, said pattern of release agent being applied to the surface of said rotating member in an amount sufficient to decrease to a predetermined extent the tendency of between about 15 percent and about 85 percent of said web to adhere to said rotating member and not more than an amount completely absorbable by said web on said rotating member, differentially creping the dried web from said rotating member at a crepe ratio between about 1.25 and about 2.5 to form a differentially dry creped tissue web having alternating coarsely creped and finely creped areas, said coarsely creped areas comprising about 15 percent and about 85 percent of the total area of said web, said coarsely creped areas having between about 5 crepes per inch and about 30 crepes per inch, the remaining area of said web comprising finely creped areas having between about 20 crepes per inch and about 200 crepes per inch, and assembling a plurality of plies of said differentially creped tissue web in superimposed relation into a finished cellulosic tissue product having a density between about 1.5 and about 2.0 pounds per cubic foot.

3. A method of fabricating an improved dry creped cellulosic tissue product, said method including the steps of water-laying a web of cellulosic tissue, said web having a basis weight before creping of between about 4 and about 10 pounds per ream of 3,000 square feet, on a bone dry basis, drying the formed tissue web on a heated rotating drum to a moisture content between about 3 and about 14 percent by weight, applying to the surface of said drum before said surface contacts said web a non-migrating pattern of release agent having an oiliness value of less than 0.3 at 20° C. as measured on the modified Deeley machine, said pattern of release agent being applied to the surface of said drum in an amount sufficient to decrease to a predetermined extent the tendency of between about 40 percent and about 60 percent of said web to adhere to said drum and not more than an amount completely absorbable by said web on said drum, differentially creping the dried web from said drum at a crepe ratio of about 2.0 to form a differentially dry creped tissue web having alternating coarsely creped and finely creped areas, said coarsely creped areas comprising between about 40 percent and about 60 percent of the total area of said web and having between about 10 and about 20 crepes per inch, the remaining area of said web comprising finely creped areas having between about 30 and about 50 crepes per inch, and assembling a plurality of plies of said differentially creped tissue web in superposed relation to form an improved cellulosic tissue product having a density between about 1.5 and about 2.0 pounds per cubic foot.

4. A method of fabricating an improved dry creped cellulosic tissue product, said method including the steps of water-laying a web of tissue from a furnish comprising 100 percent wood pulp, said web having a basis weight before creping of between about 4 and about 10 pounds per ream of 3,000 square feet, drying the formed tissue web on a heated rotating drum to a moisture content of between about 3 and 14 percent by weight, continuously applying to the surface of said drum before said surface contacts said web a non-migrating pattern of an aqueous solution of emulsion of a release agent having an oiliness value at 20° C. of less than 0.3 as measured on the modified Deeley machine, and selected from the group including diglycol laurate, fatty acids of 6 to 18 carbon atom chain length, alkyl ketene dimers, and mineral oil, said pattern being applied in an amount of between 1 and 10 pounds per ton of tissue product, that is, an amount sufficient to decrease the tendency of between about 40 percent and about 60 percent of said web to adhere to said drum and not more than an amount completely absorbable by said web on said drum, differentially dry creping said dried web from said drum at a crepe ratio of about 2.0 to form a differentially dry creped tissue web having alternating coarsely creped and finely creped areas, said coarsely creped areas comprising between about 40 percent and about 60 percent of the total area of said web and having between about 10 and about 20 crepes per inch, the remaining area of said web comprising finely creped areas having between about 30 and about 50 crepes per inch, and assembling a plurality of plies of said differentially dry creped tissue web in superposed relation to form an improved cellulosic tissue product having a density of between about 1.3 and about 2.0 pounds per cubic foot.

References Cited in the file of this patent

UNITED STATES PATENTS

| | | |
|---|---|---|
| Re. 23,637 | Montgomery | Mar. 24, 1953 |
| 1,534,622 | Wandel | Apr. 21, 1925 |
| 2,077,438 | Rowe | Apr. 20, 1937 |
| 2,132,016 | Du Bois | Oct. 4, 1938 |
| 2,725,640 | Voigtman | Dec. 6, 1955 |

OTHER REFERENCES

Casey: "Pulp and Paper," vol. II, 1952, Interscience Publishers, Inc., N.Y., page 844.